United States Patent [19]

Phillips

[11] Patent Number: 4,856,211
[45] Date of Patent: Aug. 15, 1989

[54] BICYCLE PEDAL FOOT HOLDER

[76] Inventor: Steven J. Phillips, 421 Laurel St., Des Moines, Iowa 50314

[21] Appl. No.: 916,651

[22] Filed: Oct. 8, 1986

[51] Int. Cl.$^4$ .............................................. A43B 5/16
[52] U.S. Cl. .................................... 36/131; 2/DIG. 6
[58] Field of Search ......................... 36/131; 2/DIG. 6

[56] References Cited

U.S. PATENT DOCUMENTS

| | | | |
|---|---|---|---|
| 588,038 | 8/1897 | Tudor | 36/131 |
| 3,099,884 | 8/1963 | Kixmiller et al. | 2/DIG. 6 |
| 4,055,005 | 10/1977 | Meinhart | 2/DIG. 6 |
| 4,108,452 | 8/1978 | Baron | 2/DIG. 6 |
| 4,308,672 | 1/1982 | Antonious | 36/50 |
| 4,414,692 | 11/1983 | Dzierson | 2/DIG. 6 |
| 4,457,510 | 7/1984 | Pertschuk | 2/DIG. 6 |
| 4,538,480 | 9/1985 | Trindle | 74/594.5 |

FOREIGN PATENT DOCUMENTS

| | | | |
|---|---|---|---|
| 0093139 | 10/1896 | Fed. Rep. of Germany | 36/131 |
| 0022050 | 9/0000 | United Kingdom | 36/131 |

OTHER PUBLICATIONS

Journal of American Medical Assoc., by Dr. M. Gershman, p. 930, vol. 168, No. 7, Oct. 19, 1958.

*Primary Examiner*—Werner H. Schroeder
*Attorney, Agent, or Firm*—Zarley, McKee, Thomte, Voorhees & Sease

[57] ABSTRACT

Velcro type coacting flexible gripping elements are provided on the bottom of a fastener carried by the rider's shoe and on the top of a pedal fastener connected to the bicycle pedal which allow for quick fastening of the foot to the pedal and release when desired. The foot fastener includes a strap extending around the instep of the foot and may optionally include a second strap extending around the heel while the pedal fastener includes a strap extending around the pedal.

8 Claims, 1 Drawing Sheet

U.S. Patent
Aug. 15, 1989
4,856,211
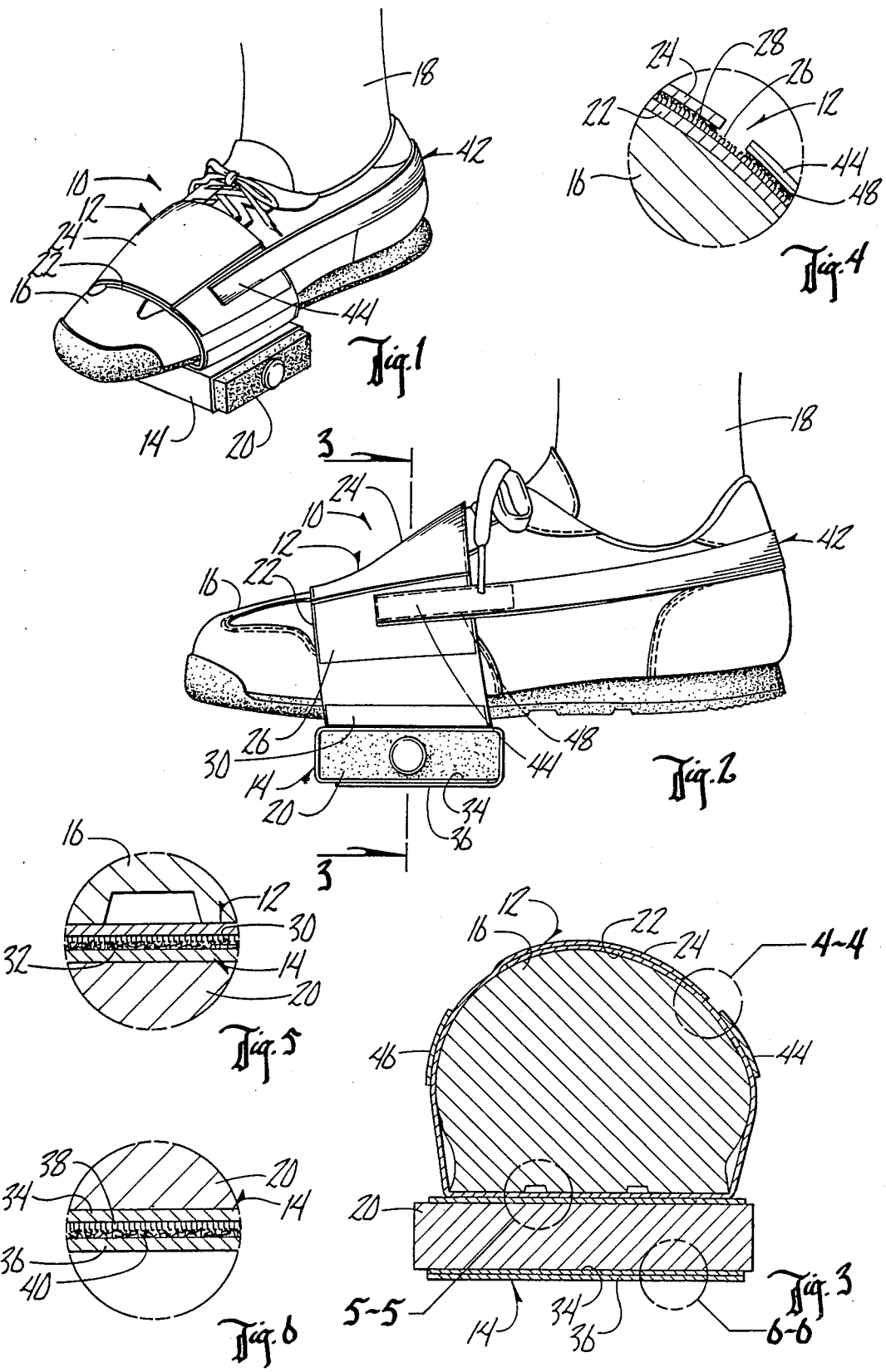

BICYCLE PEDAL FOOT HOLDER

BACKGROUND OF THE INVENTION

Some bicycle pedals utilize toe clips or baskets into which the toe of the rider's foot is placed. A strap may extend around the instep of the foot and be tightened down to lock the foot securely to the pedal. In the event of an emergency it may be difficult, if not impossible, to remove a foot from the toe clip in time to avoid injury to the rider. Some pedal systems have mechanical locking systems which interconnect the shoe of the rider to the pedal. These are even more difficult to use and run a higher risk of injury in emergency situations.

What is needed is a foot holder for securing the rider's foot to the pedal which is safe and allows for fast separation in emergency situations, but yet give a positive interlock between the shoe and the pedal during operation.

SUMMARY OF THE INVENTION

The bicycle pedal foot holder of this invention provides a positive lock between the rider's shoe and the pedal but allows for immediate separation in emergency situations and during normal dismounting of the bike.

Once the holder is put on the shoe no further adjustments are needed to attach or disattach it from the pedal. Separation from the pedal is accomplished by a simple angling upwardly of the foot relative to the pedal which allows for immediate separation.

The holder includes coacting flexible gripping elements on the bottom of the foot and the top of the pedal. A strap extends around the pedal and the flexible gripping elements are positioned on the top side to engage flexible gripping elements on the bottom side of a foot fastener carried by the rider's shoe. A single strap may be provided for extending around the instep of the foot or an additional strap may extend around the heel to keep the foot from moving out of the instep strap.

The rider can easily walk with the foot fastener on his shoe as the flexible gripping elements readily permit such activity. Alternatively, the foot fastener may be quickly removed for normal walking. The pedal fastener may be left on the pedal at all times.

BRIEF DESCRIPTION OF THE DRAWINGS

FIG. 1 is a perspective view of the bicycle pedal foot holder of this invention in use releasably securing a rider's foot to a bicycle pedal.

FIG. 2 is a side elevational view thereof.

FIG. 3 is a cross-sectional view taken along lines 3—3 in FIG. 2.

FIG. 4 is an enlarged cross-sectional view of the area indicated by the lines 4—4 in FIG. 3.

FIG. 5 is an enlarged cross-sectional view of the area indicated by the lines 5—5 in FIG. 3.

FIG. 6 is an enlarged cross-sectional view of the area indicated by the lines 6—6 in FIG. 3.

DESCRIPTION OF THE PREFERRED EMBODIMENT

The bicycle pedal foot holder of this invention is referred to generally in FIG. 1 by the reference numeral 10 and includes a foot fastener 12 and a pedal fastener 14.

The foot fastener 12 is releasably secured to the shoe 16 of a wearer's foot 18 while the pedal fastener 14 is releasably secured to a pedal 20 of a bicycle (not shown). A foot fastener 12 includes a continuous strap having opposite ends 22 and 24 which are provided with coacting flexible gripping elements 26 and 28, respectively, which allow for tightening the strap as desired around the wearer's foot, as seen in FIG. 5. Coacting flexible gripping elements 30 are provided on the bottom side of the foot fastener 12 and coact with flexible gripping elements 32 on the top side of the pedal fastener 14. The pedal fastener 14 includes a continuous strap having opposite ends 34 and 36, as seen in FIG. 6, which carry flexible gripping elements 38 and 40, respectively.

A heel strap 42 is provided having opposite ends 44 and 46, as seen in FIGS. 3 and 4. The flexible gripping elements 48 on the strap 42 coact with the elements 26 on the foot fastener strap 22.

It is thus seen in operation that the pedal fastener 14 may be quickly attached or removed from the pedal 20 by selectively adjusting the ends 34 and 36 through use of the coacting flexible gripping elements. The same quick attachment and removal is possible with the foot fastener 12 to the shoe 16 and with or without the heel strap 42. Removal of the heel strap 42 allows for the insole strap 22 of the foot fastener 12 to be left on the pedal and the foot simply pulled out by moving it rearwardly. When returning to the bicycle the foot is merely reinserted into the strap 22 which provides a sleeve-like retainer. Ordinarily, the rider will simply separate his foot from the pedal by raising the heel relative to the pedal and the foot fastener 12 will peel away from the pedal fastener 14 as the coacting flexible gripping elements 38 and 40 become disengaged. It is seen that the rider can ride in complete comfort and confidence that in emergency situations he or she will be able to act quickly enough to avoid any injury. During use, however, the coacting flexible gripping elements provide the positive locking action required for maximum efficiency in transferring energy and force from the foot to the bicycle pedal.

What is claimed is:

1. Bicycle pedal foot holder comprising,
a pedal fastener including an adjustable strap adapted to extend completely around a pedal for securing the fastener to a pedal,
a foot fastener including means for securing the foot fastener to a foot, and
coacting flexible (Velcro type) hook and eye gripping elements on said pedal fastener and said foot fastener, said gripping elements being positioned to provide an interface of engagement in a plane between the top of the pedal and the bottom of a foot for releasably connecting a foot to a pedal.

2. The holder of claim 1 wherein said shoe fastener includes a strap adapted to extend around a shoe.

3. The holder of claim 2 wherein said shoe strap is adapted to extend over the instep of a shoe.

4. The holder of claim 3 wherein said shoe strap includes a strap element adapted to extend around the heel of the shoe to limit foot movement out of a shoe opening formed by said foot strap adapted to extend around the instep of a shoe.

5. The holder of claim 1 wherein said pedal strap includes opposite ends having coacting flexible hook and eye gripping elements adapted to be selectively interconnected on the bottom side of a pedal to releasably secure said pedal strap to a pedal.

6. The holder of claim 2 wherein said foot strap includes opposite ends having coacting flexible hook and eye gripping elements adapted to be selectively interconnected on the top of a shoe to releasably secure said foot strap to a shoe.

7. The holder of claim 4 wherein said strap element adapted to extend around the heel of the shoe includes opposite ends with one of said strap ends being secured to said shoe fastener and the other end having flexible hook or eye gripping elements adapted to releasably engage flexible hook or eye gripping elements on said foot fastener.

8. Bicycle pedal foot holder comprising,
- a pedal fastener including an adjustable strap adapted to extend completely around a pedal for securing the fastener to a pedal,
- a foot fastener including means for securing the foot fastener to a foot,
- coacting flexible hook and eye gripping elements on said pedal fastener and said foot fastener, said gripping elements being positioned to provide an interface of engagement in a plane between the top of the pedal and the bottom of a foot for releasably connecting a foot to a pedal,
- said foot fastener including a strap adapted to extend over the instep of a shoe and said foot strap including opposite ends having coacting flexible hook and eye gripping elements adapted to be selectively interconnected on the top of a shoe to releasably secure said foot strap to a shoe,
- said foot strap including a heel strap element adapted to extend around the heel of the shoe to limit foot movement out of a shoe opening formed by said foot strap adapted to extend around the instep of a shoe, said heel strap element including opposite ends with one end being secured to said foot fastener and the other end having flexible hook or eye gripping elements adapted to releasably engage flexible hook or eye gripping elements on said foot fastener, and
- said pedal strap including opposite ends having coacting flexible hook and eye gripping elements adapted to be selectively interconnected on the bottom side of a pedal to releasably secure said pedal strap to a pedal.

* * * * *